E. C. GRAY.
SHOCK ABSORBER.
APPLICATION FILED FEB. 7, 1916.
1,216,226.
Patented Feb. 13, 1917.
3 SHEETS—SHEET 1.
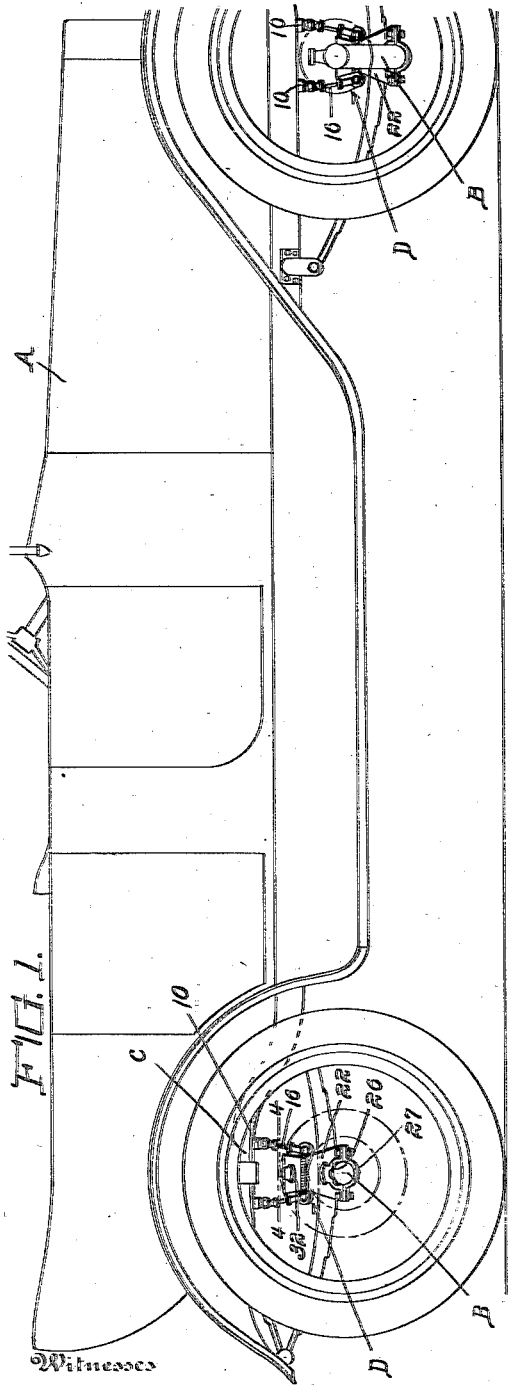
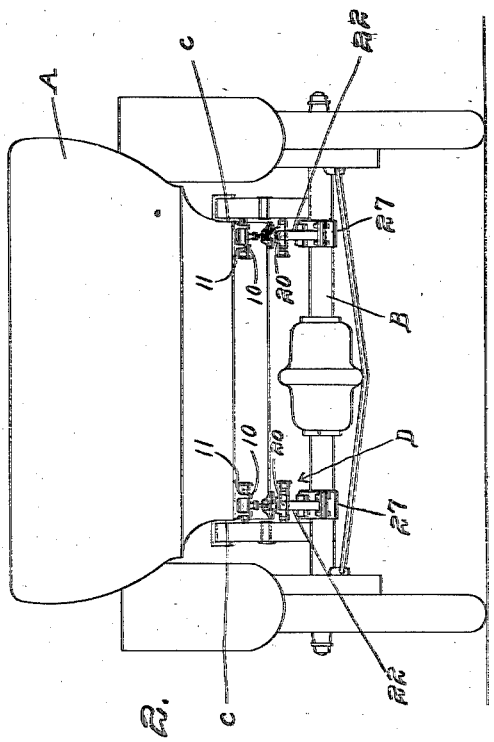
Inventor
E. C. Gray
By Victor J. Evans
Attorney

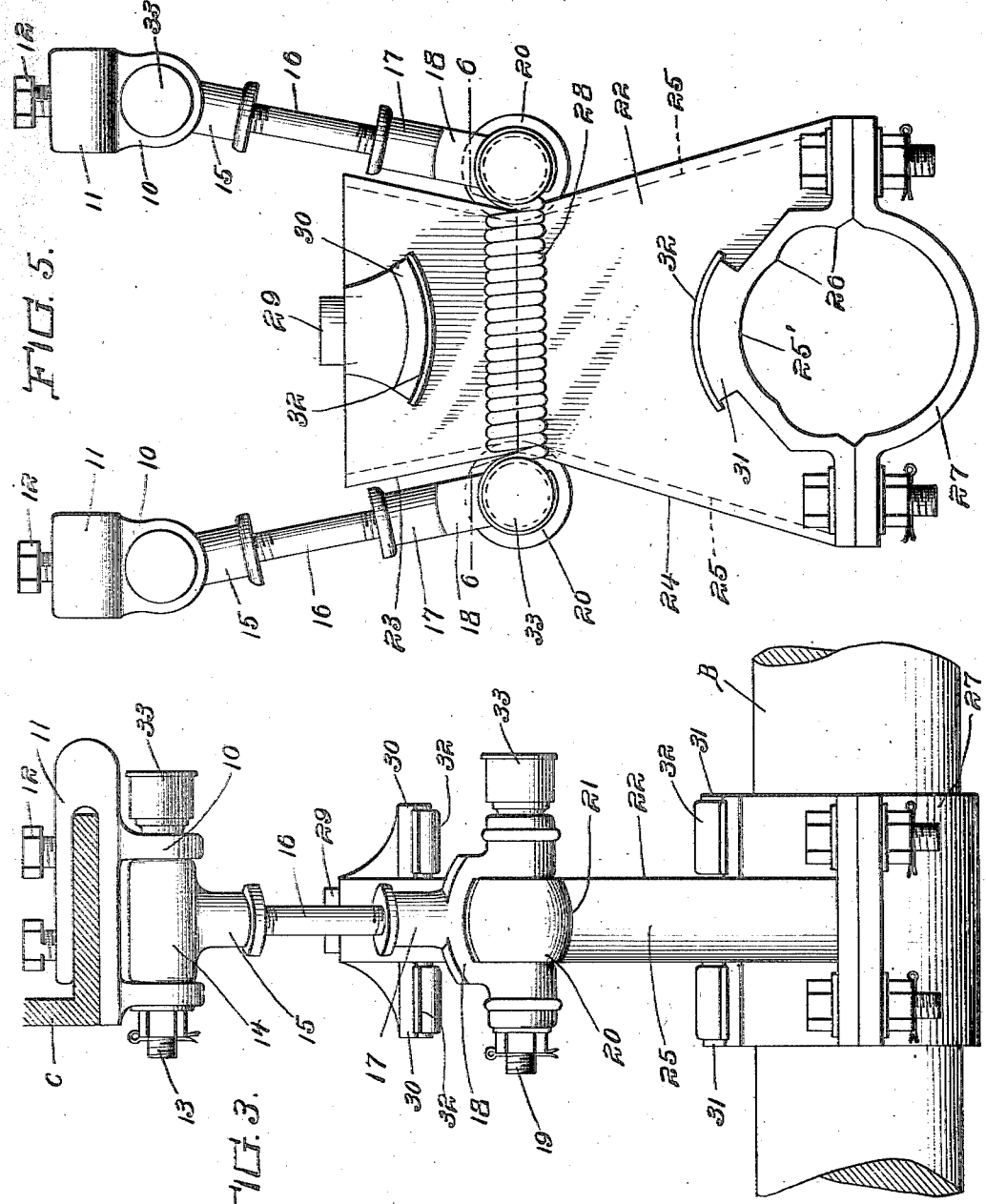

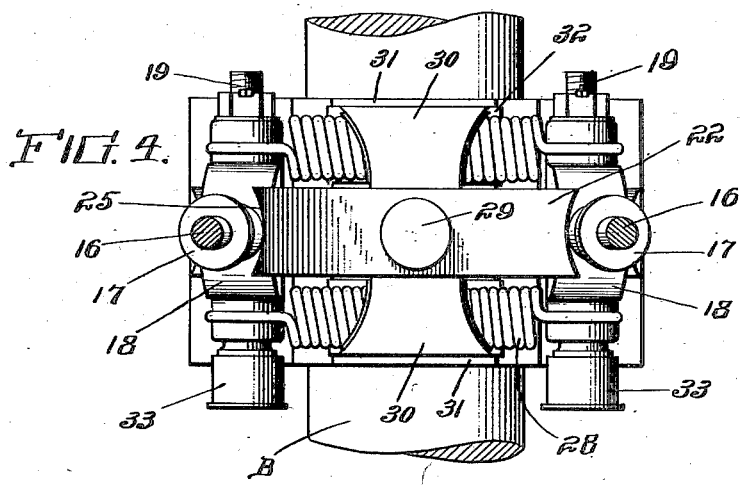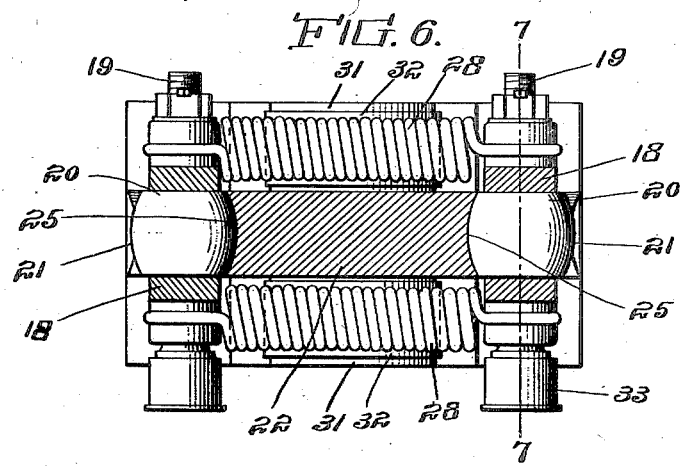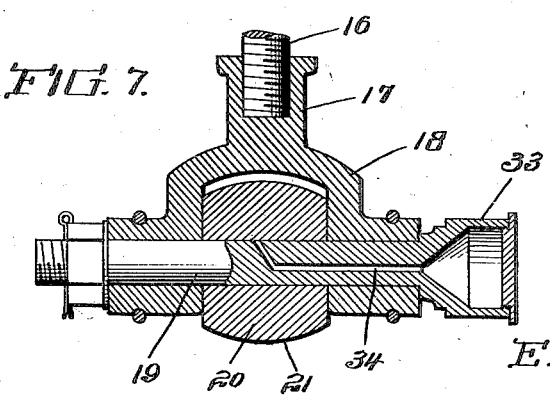

UNITED STATES PATENT OFFICE.

EARL C. GRAY, OF ST. CHARLES, MISSOURI.

SHOCK-ABSORBER.

1,216,226.  Specification of Letters Patent.  Patented Feb. 13, 1917.

Application filed February 7, 1916. Serial No. 76,793.

*To all whom it may concern:*

Be it known that I, EARL C. GRAY, a citizen of the United States, residing at St. Charles, in the county of St. Charles and State of Missouri, have invented new and useful Improvements in Shock-Absorbers, of which the following is a specification.

The invention relates to a shock absorber, and more particularly to the class of vehicle or automobile shock absorbers.

The primary object of the invention is the provision of a device of this character wherein any and all undue shocks and jars are absorbed thereby incident to the travel of the vehicle or automobile, thereby relieving the same from its body, thus materially increasing the life of said vehicle or automobile and at the same time assuring perfect comfort to the users or occupants thereof.

Another object of the invention is the provision of a shock absorber of this character wherein the construction thereof is novel in form so that it can be applied to any well known style of vehicle or automobile to withstand varying loads and to relieve and absorb all shocks and jars when the vehicle or automobile is in motion.

A further object of the invention is the provision of a shock absorber of this character wherein the same can be readily and easily adjusted and applied to a vehicle or automobile or removed therefrom with despatch.

A still further object of the invention is the provision of a shock absorber of this character which is simple in construction, thoroughly reliable and efficient in operation, strong, durable and inexpensive in manufacture.

Other objects will be in part obvious and in part hereinafter pointed out.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a side elevation of an automobile showing the shock absorbers constructed in accordance with the invention applied;

Fig. 2 is a rear elevation thereof;

Fig. 3 is a fragmentary vertical transverse sectional view showing in edge elevation the shock absorber;

Fig. 4 is a horizontal transverse sectional view on the line 4—4 of Fig. 1;

Fig. 5 is a detail side view of the shock absorber;

Fig. 6 is a sectional view on the line 6—6 of Fig. 5;

Fig. 7 is a sectional view on the line 7—7 of Fig. 6.

Similar reference characters indicate corresponding parts throughout the several views of the drawings.

Referring to the drawings in detail, A designates generally an automobile which is of any ordinary well known construction, B each stationary axle thereof and C each side beam of the truck frame of said automobile, which is of the usual well known construction. Detachably connected with each axle B and the side beam C is a shock absorber D, the detail construction of which is hereinafter set forth.

The shock absorber comprises a pair of hangers 10, each formed with a jaw 11 which is adapted to engage with the side beams C and carries a pair of binding screws 12 which serve to fasten the hangers thereon. The hangers are disposed in spaced relation to each other and each carries a pivot bolt 13 which is passed through a sleeve 14 formed with a central internally threaded boss 15 and adjustably engaged in these bosses are hanger rods 16 which are also adjustably engaged in internally threaded bosses 17 formed centrally on wheel yokes 18 having passed therethrough stud axles 19 rotatably supporting friction rollers 20 which are formed with convexed peripheries 21 for a purpose presently described.

Detachably mounted on each axle B is a perpendicular casting forming a spreader plate 22 which is of substantially double wedge shape, presenting convergent upper and lower beveled edges 23 and 24, respectively, the same being formed with grooves or channels 25 corresponding to the peripheral shape of the friction rollers 20 so that the latter will engage and travel therein.

Each spreader plate 22 is formed with a notch 25′ finished to provide an irregular surface to present biting spurs 26 for gripping engagement with the axle B which is seated in the notch 25′, and detachably bolted or otherwise fixed to the plate 22 at its lower edge is a clip 27 which coacts with the notch 25' in said plate to embrace the axle B, and in this manner the plate 22 is firmly and securely fastened upon the axle to prevent the turning of the plate thereon.

Connected with the wheel yoke 18 and disposed at opposite sides of the plate 22 are coiled retractile springs 28 which serve to hold the rollers 20 engaged in the grooves in opposite edges of the plate 22 and also to resist the spreading of the hanger rods 16 when subjected to a load and to shocks and jars incident to the travel of the vehicle for absorbing such shocks and jars and sustaining the load of the automobile.

Mounted in the upper end of the plate 22 is a resilient block 29 which forms a cushion to be engaged by the side beam C of the truck frame when excessive load is carried by the automobile, while formed on opposite sides of the plate 22 are upper and lower arcuate shaped flanges 30 and 31, the same supporting resilient strips 32 which serve as buffers for the spring 28 on the excessive extending or contracting of the shock absorber under the influence of shocks and jars and when the springs engage with the resilient strips 32 the tension thereof is increased upon the rollers 20 so as to materially resist the spreading action of the rod 16 suspending the said rollers.

It is of course understood that these shock absorbers are used in conjunction with the springs ordinarily employed on automobiles and serve to absorb all shocks and jars incident to the travel of the automobile, thereby relieving the strains upon the body of the same and thus increasing the life of the automobile.

Each bolt 13 and stud axle 19 has mounted thereon an oil cap 33 adapted to contain oil which is delivered therefrom through a passage 34 so as to lubricate the sleeve 14 and the rollers 20 respectively.

From the foregoing description, taken in connection with the accompanying drawings, the construction and operation of my improved shock absorber will be readily apparent and, therefore, a more extended explanation has been omitted.

Having thus described my invention, I claim:

1. A shock absorber comprising a pair of swinging members adapted for detachable connection with the side beam of a truck frame, a spreader element adapted to be connected to the axle of the truck frame, rollers carried by the swinging members and engageable with the spreader element, resilient means connected with the swinging members to hold the rollers in positive engagement with the spreader element and also for tensioning the said swinging members, and buffers arranged on the spreader element in the path of movement of the resilient means to increase the tension thereof when engaged thereby.

2. A shock absorber comprising a pair of swinging members adapted for detachable connection with the side beam of a truck frame, a spreader element adapted to be connected to the axle of the truck frame, rollers carried by the swinging members and engageable with the spreader element, resilient means connected with the swinging members to hold the rollers in positive engagement with the spreader element and also for tensioning the said swinging members, buffers arranged on the spreader element in the path of movement of the resilient means to increase the tension thereof when engaged thereby, and means for securely fastening the spreader element on the axles.

3. A shock absorber comprising a pair of swinging members adapted for detachable connection with the side beam of a truck frame, a spreader element adapted to be connected to the axle of the truck frame, rollers carried by the swinging members and engageable with the spreader element, resilient means connected with the swinging members to hold the rollers in positive engagement with the spreader element and also for tensioning the said swinging members, buffers arranged on the spreader element in the path of movement of the resilient means to increase the tension thereof when engaged thereby, means for securely fastening the spreader element on the axles, convergent upper and lower beveled edges on the spreader element and having channels, and convexed peripheries formed on the rollers corresponding to the channels.

In testimony whereof I affix my signature in presence of two witnesses.

EARL C. GRAY.

Witnesses:
W. F. ACHELPOHL,
JNO. G. DUEBBERT.